(12) United States Patent
Yamada

(10) Patent No.: US 8,464,931 B2
(45) Date of Patent: *Jun. 18, 2013

(54) DISPLAY DEVICE, DISPLAY METHOD, AND PROGRAM

(75) Inventor: Yasuhiro Yamada, Tokyo (JP)

(73) Assignee: Sony Corporation (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/477,484

(22) Filed: May 22, 2012

(65) Prior Publication Data

US 2012/0228373 A1    Sep. 13, 2012

Related U.S. Application Data

(63) Continuation of application No. 12/312,798, filed as application No. PCT/JP2007/072666 on Nov. 22, 2007, now Pat. No. 8,302,849.

(30) Foreign Application Priority Data

Dec. 1, 2006 (JP) .................................. 2006-326187

(51) Int. Cl.
 *G06F 17/00* (2006.01)
(52) U.S. Cl.
 USPC ............................. 235/375; 235/380; 235/487
(58) Field of Classification Search
 USPC ................. 235/375, 385, 472.01, 487, 472.02
 See application file for complete search history.

(56) References Cited

U.S. PATENT DOCUMENTS 7,840,237 B2   11/2010  Panabaker et al.

FOREIGN PATENT DOCUMENTS

| JP | 11066398 A | 3/1999 |
|---|---|---|
| JP | 2002-032827 A | 1/2002 |
| JP | 2003331212 A | 11/2003 |
| JP | 2004-110759 A | 4/2004 |
| JP | 2006-023864 A | 1/2006 |
| JP | 2006195925 A | 7/2006 |

OTHER PUBLICATIONS

Supplementary European Search Report EP 07832395, dated Feb. 21, 2011.
Office Action from Japanese Application No. 2006-326187, dated Mar. 13, 2012.

*Primary Examiner* — Edwyn Labaze
(74) *Attorney, Agent, or Firm* — Lerner, David, Littenberg, Krumholz & Mentlik, LLP

(57) ABSTRACT

A display device includes a display unit, a contactless communication unit provided such that at least a part thereof overlaps with the display unit or is provided near the display unit and carries out contactless communication with plural kinds of IC cards, a storage that stores announcement data relating to the kinds of the respective IC cards, a controller that selects the kinds of IC cards, and an operation component for further selection of the kind of one IC card from the kinds of IC cards selected by the controller. The announcement data stored in the storage are displayed on the display unit before readout of the kinds of IC cards by the contactless communication unit. The kinds of IC cards with which contactless communication is possible are selected by the controller, and the kind of one IC card is further selected by the operation component.

24 Claims, 9 Drawing Sheets

DISPLAY DEVICE, DISPLAY METHOD, AND PROGRAM

CROSS-REFERENCE TO RELATED APPLICATIONS

The present application is a continuation of U.S. patent Ser. No. 12/312,798, filed May 27, 2009, which application is a national phase entry under 35 U.S.C. 371 of International Application No. PCT/JP2007/072666 filed Nov. 22, 2007, which claims priority from Japanese Patent Application No. P2006-326187 filed Dec. 1, 2006, all of which is incorporated herein by reference.

TECHNICAL FIELD

The present invention relates to a display device, a display method, and a program that can clearly show a user of a contactless IC card that allows use of plural card services the card services that can be used by the user when the user uses the contactless IC card

BACKGROUND ART

Conventionally, for a reader/writer of a contactless IC card that allows use of plural card services, the card services that can be used with this reader/writer are fixed in advance in many cases. Therefore, for example, symbols or the like of the card services that can be used by a user are frequently shown to the user by a sticker, a printing, or the like on the contactless IC card reader/writer or the periphery thereof.

However, in the use of the reader/writer of the contactless IC card for plural card services, for example, a sticker, a printing, or the like that has been used for many years possibly makes it difficult to see the symbols or the like thereon, which possibly makes it difficult for the user to know the card services that can be used by the user. In addition, the contactless IC card for plural card services that can be used by a user involves e.g. a problem that it is difficult to know which card service can be used among the plural card services included in the contactless IC card. Examples of related documents of the present application include Japanese Patent Laid-open No. 2006-23864.

DISCLOSURE OF INVENTION

Problems to be Solved by the Invention

The present invention is proposed in view of the conventional circumstances and an objective thereof is to provide a display device, a display method, and a program that can clearly show a user of a contactless IC card that allows use of plural card services the card services that can be used by the user when the user uses the contactless IC card.

In order to achieve the above-described objective, a display device according to the present invention includes display means, contactless communication means that is so provided that at least a part of the contactless communication means overlaps with the display means or is provided near the display means, and carries out contactless communication with plural kinds of memories, and storage means that stores announcement data for announcement relating to the kinds of memories with which contactless communication by the contactless communication means is possible. The display device further includes first selection means for selection of the kinds of the memories with which contactless communication by the contactless communication means is possible, second selection means for further selection of the kind of one memory with which contactless communication is to be carried out from the kinds of the memories selected by the first selection means, and control means that displays all of announcement data stored in the storage means on the display means before readout of a kind of the memory by the contactless communication means and selects, by the first selection means, the kinds of the memories with which contactless communication by the contactless communication means is possible. The control means displays, on the display means, the announcement data for announcement relating to the kind of one memory with which contactless communication is to be carried out after the kind of one memory is further selected by the second selection means from the kinds of the memories selected by the first selection means.

Furthermore, a display method according to the present invention includes a step of displaying, on display means, all of announcement data that are stored in storage means and provide announcement relating to the kinds of memories with which contactless communication by contactless communication means is possible, and a step of carrying out contactless communication by the contactless communication means that is so provided that at least a part of the contactless communication means overlaps with the display means or is provided near the display means. The method further includes a step of selecting, by the first selection means, the kinds of the memories with which contactless communication by the contactless communication means is possible, a step of further selecting, by the second selection means, the kind of one memory with which contactless communication is to be carried out from the kinds of the memories selected by the first selection means, and a step of displaying, on the display means, the announcement data for announcement relating to the kind of the memory selected by the second selection means.

The above-described present invention can be formed by hardware. In addition, it can be realized also by software. Specifically, a program according to the present invention causes a computer to execute processing of displaying, on display means, all of announcement data that are stored in storage means and provide announcement relating to the kinds of memories with which contactless communication by contactless communication means is possible, carrying out contactless communication by the contactless communication means that is so provided that at least a part of the contactless communication means overlaps with the display means or is provided near the display means, selecting, by the first selection means, the kinds of the memories with which contactless communication by the contactless communication means is possible, further selecting, by the second selection means, the kind of one memory with which contactless communication is to be carried out from the kinds of the memories selected by the first selection means, and displaying, on the display means, the announcement data for announcement relating to the kind of the memory selected by the second selection means. This program is distributed via a network or a portable storage medium such as an optical disk or an IC card, and is installed in a computer so as to be executed in the computer.

Moreover, in order to achieve the above-described objective, a display device according to the present invention includes display means and contactless communication means that is so provided that at least a part of the contactless communication means overlaps with the display means or is provided near the display means, and carries out contactless communication with plural kinds of memories. The display device further includes storage means that stores announcement data for announcement relating to the kinds of memories with which contactless communication by the contactless communication means is possible, selection means for selection of the kind of the one memory to be read out by the contactless communication means, and control means that displays all of announcement data stored in the storage means on the display means before selection of a kind of the memory by the selection means, and displays the announcement data that is selected on the display means after selection of the kind of the one memory by the selection means.

Furthermore, a display method according to the present invention includes a step of displaying, on display means, all of announcement data that are stored in storage means and provide announcement relating to the kinds of memories, a step of selecting, by selection means, a kind of one memory from the all of announcement data displayed on the display means, a step of displaying the announcement data selected by the selection means on the display means, and a step of carrying out contactless communication by contactless communication means that is so provided that at least a part of the contactless communication means overlaps with the display means or is provided near the display means.

The above-described present invention can be formed by hardware. In addition, it can be realized also by software. Specifically, a program according to the present invention causes a computer to execute processing of displaying, on display means, all of announcement data that are stored in storage means and provide announcement relating to the kinds of memories, selecting, by selection means, a kind of one memory from the all of announcement data displayed on the display means, displaying the announcement data selected by the selection means on the display means, and carrying out contactless communication by contactless communication means that is so provided that at least a part of the contactless communication means overlaps with the display means or is provided near the display means. This program is distributed via a network or a portable storage medium such as an optical disk or an IC card, and is installed in a computer so as to be executed in the computer.

According to the present invention, when a user uses a contactless IC card that allows use of plural card services, the announcement data that are stored in the storage means and relate to all the kinds of IC cards are displayed on the display means before the user carries out contactless communication between the IC card and the contactless communication means. Subsequently, from the kinds of memories with which contactless communication by the contactless communication means is possible, selected by the first selection means, the kind of one memory is further selected by the second selection means. Thereafter, the announcement data selected by the second selection means is displayed on the display means, which is so provided that at least a part of the display means overlaps with the contactless communication means or is provided near the contactless communication means. This can clearly show the user the card service that can be used by the user.

Furthermore, according to the present invention, when a user having plural contactless IC cards each allowing use of one card service uses the IC card, the announcement data that are stored in the storage means and relate to all the kinds of IC cards are displayed on the display means before the user selects the kind of IC card to be used by the selection means. After the user selects the kind of one memory by the selection means, the selected announcement data is displayed on the display means, which is so provided that at least a part of the display means overlaps with the contactless communication means or is provided near the contactless communication means. This can clearly show the user the card service that can be used by the user.

BEST MODE FOR CARRYING OUT THE INVENTION

A display device 1 to which the present invention is applied will be described below with reference to the drawings.

Figure 1:
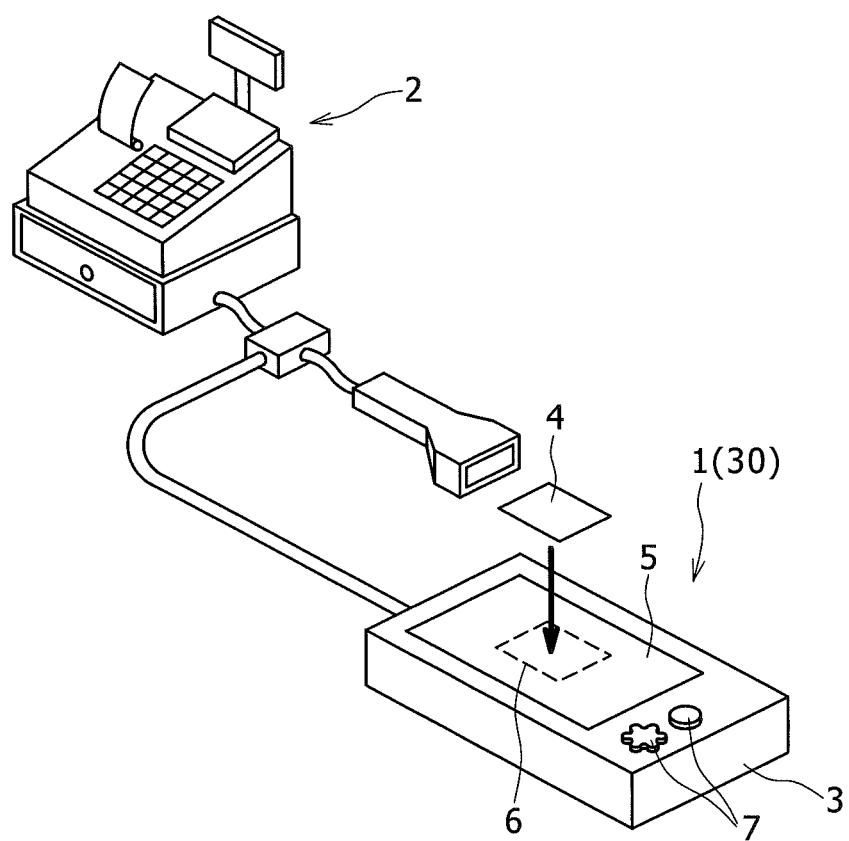
FIG. 1 is a diagram showing an embodiment of a display device to which the present invention is applied.
Figure 2:
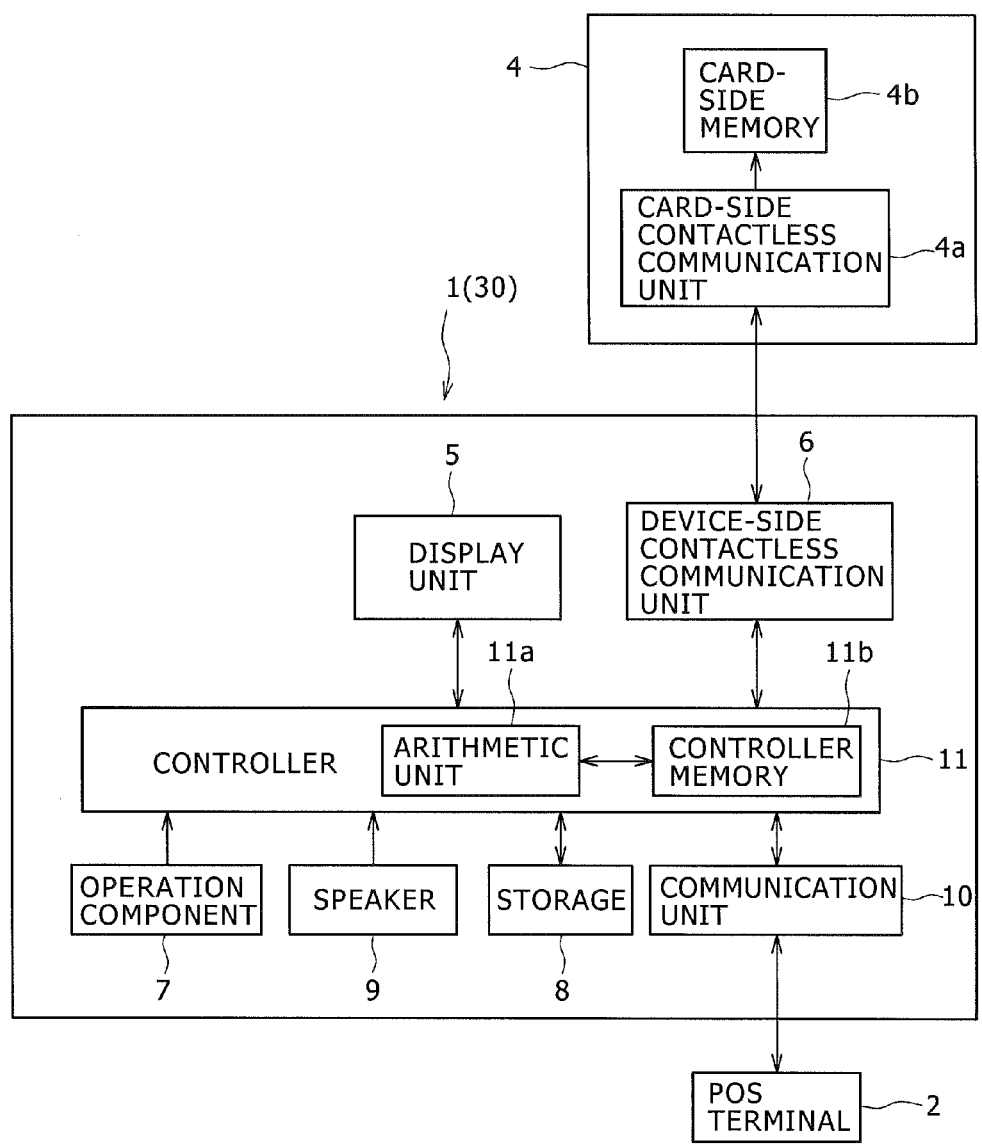
FIG. 2 is a block diagram of the display device to which the present invention is applied.

As shown in FIGS. 1 and 2, the display device 1 to which the present invention is applied is placed near a POS terminal 2 placed in a store such as a supermarket or a convenience store.

This display device 1 includes a device main body 3 serving as a plate external case with a substantially-rectangular shape, a display unit 5 for displaying the kinds of card services of an IC card 4 that are usable in this store, a contactless communication unit 6 for contactless communication with the IC card 4, and an operation component 7 as selection means for selection of the kind of card service. Furthermore, the display device 1 includes a storage 8 for storing announcement data relating to the card services, a speaker 9 for announcement to a user, a communication unit 10 for communication with the POS terminal 2 via a network, and a controller 11 for controlling the operation of the entire device.

This display device 1 displays all the kinds of card services that are usable in this store on the display unit 5 and outputs the kinds of card services as sounds from the speaker 9. In addition, when a user having the IC card 4 that allows use of plural card services purchases a desired commercial product, the user holds the IC card 4 over the contactless communication unit 6. In response to this, the display device 1 displays the kinds of card services that are usable in this store among the card services included in the IC card 4 held by the user as icons on the display unit 5. When the kind of card service to be used by the user is selected by the operation component 7 from the kinds of card services displayed on the display unit 5, the display device 1 displays only the kind of selected card service as an icon on the display unit 5 and outputs this kind of card service as a sound from the speaker 9. Subsequently, the user holds the IC card 4 over the contactless communication unit 6 provided in such a manner as to overlap with the display unit 5, which displays only the icon of the selected card service. Thereupon, the display device 1 carries out contactless communication with the IC card 4 in order to execute payment processing and so on.

The display unit 5 is formed of an LCD (Liquid Crystal Display), a CRT (Cathode Ray Tube), or the like as shown in FIG. 1. An optically-transparent substrate is provided on the surface of one major plane of the display unit 5, although not shown in the drawing. This optically-transparent substrate is composed of e.g. a plate material having optical transparency, such as an acrylic plate, and allows vision of an image displayed on the LCD, CRT, or the like therethrough. At substantially the center of the major plane thereof, the contactless communication unit 6 for contactless communication with the IC card 4 is incorporated. The display unit 5 displays all the kinds of card services that can be used in this store as icons until the IC card 4 is held over the contactless communication unit 6 to be described later by a user. When the IC card 4 is held over the contactless communication unit 6 by a user, the display unit 5 displays the kinds of card services that are usable in this store among the plural card services included in the IC card 4 held by the user, as icons. When a card service is selected from the icons of the card services by the user, the display unit 5 displays only the selected card service as an icon.

Figure 3:
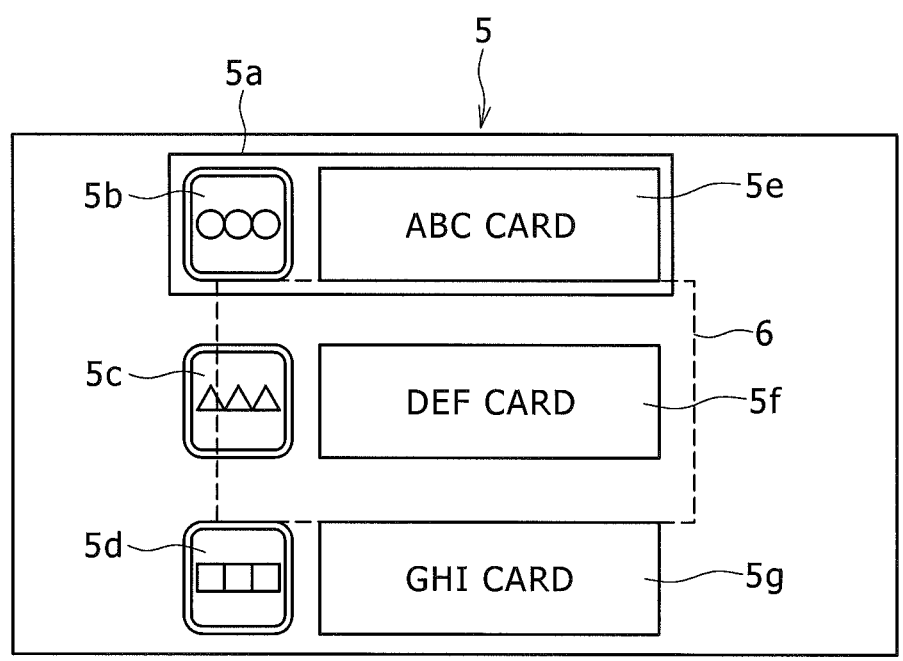
FIG. 3 is a diagram showing the state of a display unit that displays all the kinds of IC cards that are usable in a store as icons.
Figure 4:
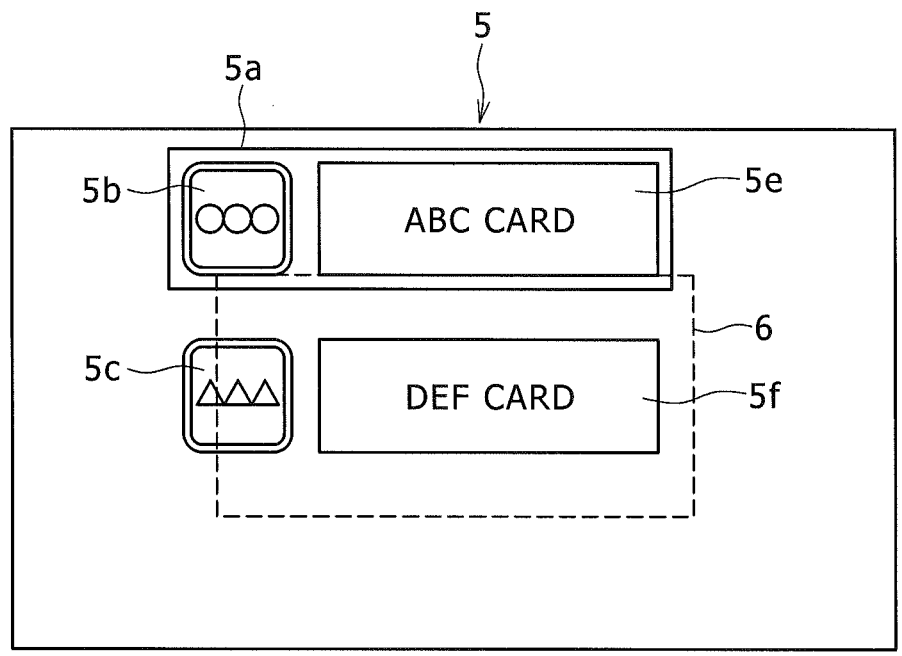
FIG. 4 is a diagram showing the state of the display unit that displays, as icons, all the kinds of IC cards that are usable in this store among plural card services included in an IC card held by a user.

Specifically, as shown in FIG. 3, the display unit 5 displays all the kinds of card services that can be used in the store as a list including icons and the names of the card services. In FIG. 3, "ABC card," "DEF card," and "GHI card" are displayed as the card services that are usable in this store, and icons 5b, 5c, and 5d (hereinafter, the icons 5b, 5c, and 5d will be referred to also as the "icons" simply) and card service names 5e, 5f, and 5g (hereinafter, the card service names 5e, 5f, and 5g will be referred to also as the "card service names" simply) of these card services are displayed as a list. When the IC card 4 that allows use of card services of "ABC card," "DEF card," and "JKL card" is held over the contactless communication unit 6 to be described later, the kinds of card services that can be used in this store are selected by the controller 11 to be described later from the card services included in the IC card 4 held by the user. Thereupon, as shown in FIG. 4, the display unit 5 displays the icons 5b and 5c of "ABC card" and "DEF card" and the names 5e and 5f of the IC card 4 as a list.

Figure 5:
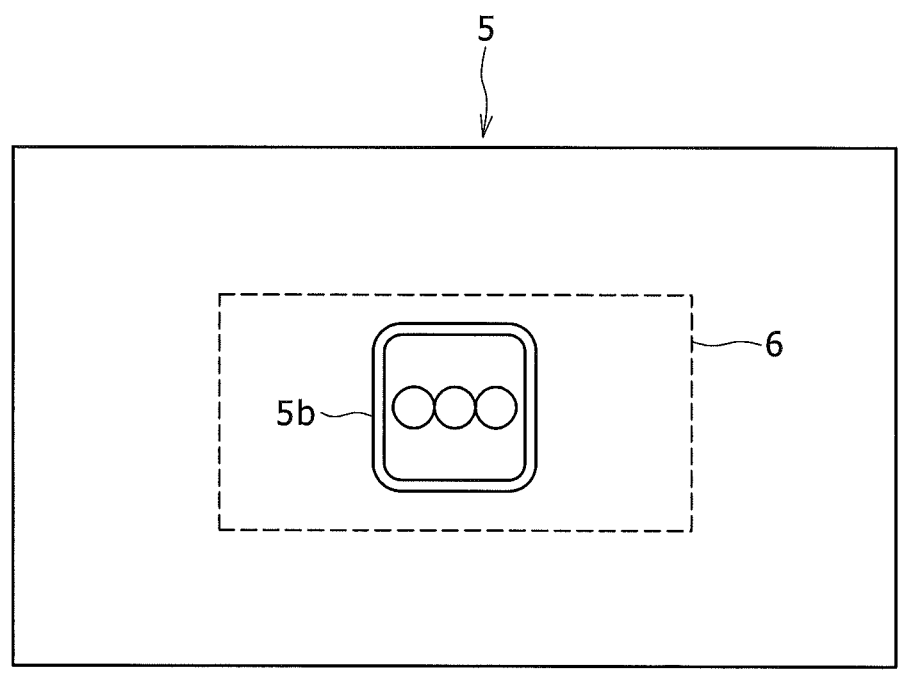
FIG. 5 is a diagram showing the state of the display unit that displays only the IC card selected by the user.

When "ABC card" to be used is selected from "ABC card" and "DEF card" by the user through setting of a cursor 5a by operation of the operation component 7 to be described later, the display unit 5 displays only the icon 5b of the selected "ABC card" as shown in FIG. 5.

The display unit 5 is not limited to the structure in which the contactless communication unit 6 is provided at substantially the center of the display unit 5, but the contactless communication unit 6 may be incorporated e.g. on the lower side of the center of the major plane of the display unit 5 in plan view or on the lower right side of the major plane in plan view in such a way that all of the contactless communication unit 6 overlaps with the display unit 5.

The display unit 5 is not limited to displaying of the kinds of card services that can be used in the store as icons and card service names. For example, only announcement data of either one of the icons and the card service names may be displayed. In addition, announcement may be carried out with another kind of announcement data such as audio data. Moreover, the display unit 5 is not limited to displaying of the kinds of card services that can be used in the store as a list, but may sequentially display them in units of one or plural card services for example.

The contactless communication unit 6 communicates with the IC card 4 by short-range or close-range contactless wireless communication such as RFID (Radio Frequency Identification System) or NFC (Near Field Communication) as shown in FIGS. 1 and 2. The contactless communication unit 6 has an antenna coil and a communication circuit connected to this antenna coil. At least a part of the antenna coil overlaps with the display unit 5. The contactless communication unit 6 modulates data to be transmitted so as to be recorded in the IC card 4 by the communication circuit and transmits the modulated data to the IC card 4. In addition, the contactless communication unit 6 demodulates data read out from the IC card 4 and outputs the demodulated data to the controller 11.

The IC card 4 to communicate with the contactless communication unit 6 will be described below. This IC card 4 has a card-side contactless communication unit 4a for communication with the contactless communication unit 6 and a card-side memory 4b for storing various kinds of information data. The card-side contactless communication unit 4a is composed of an antenna coil and a card-side communication circuit connected to this antenna coil. For transmission of various kinds of information data stored in the card-side memory 4b to the contactless communication unit 6, the card-side contactless communication unit 4a modulates the transmission data by the card-side communication circuit and outputs the modulated data by the antenna coil. In addition, the card-side contactless communication unit 4a demodulates data received from the contactless communication unit 6 and stores the demodulated data in the card-side memory 4b. The card-side memory 4b is a semiconductor memory such as a nonvolatile memory. In the card-side memory 4b, management data such as specific card identifier data for identification of the IC card 4, money data, and history data of the IC card 4 are stored corresponding to the respective card services. The IC card 4 is not limited to allowing use of one card service but may allow use of plural card services through provision of plural card-side memories 4b for example.

The respective antenna coils in the contactless communication unit 6 and the card-side contactless communication unit 4a are magnetically coupled with each other by inductive coupling, which allows contactless communication between the IC card 4 and the display device 1. Specifically, for payment processing with the IC card 4 at the time of commercial product purchase for example, the contactless communication unit 6 reads out money data from the card-side memory 4b in the IC card 4. Subsequently, the contactless communication unit 6 transmits the money data resulting from money decrease processing corresponding to the purchase price to the IC card 4. In addition, the contactless communication unit 6 transmits the ID of the purchased product, the ID of the store, and history data such as the purchase date and time to the IC card 4. The IC card 4 that has received the transmitted data updates the money data and the history data stored in the card-side memory 4b.

The operation component 7 is provided near the display unit 5 as shown in FIG. 1, and is formed by combining a push button, arrow keys, a touch panel integrated with the display unit 5, and so on. The operation component 7 moves the cursor 5a in response to operation by a user in order to select one card service to be used by the user from the card services displayed on the display unit 5 as shown in FIG. 4 for example.

The operation component 7 may be formed of e.g. a rotation-and-press switch that allows both the movement of the cursor 5a displayed on the display unit 5 and selection-and-decision operation. Furthermore, the operation component 7 may be formed by combining plural parts or all parts of a push button, arrow keys, a touch panel, and a rotation-and-press switch. Alternatively, it may be formed of only one of these parts solely. The operation component 7 is not limited to being provided near the display unit 5 but may be provided on the POS terminal 2 so that a store staff or the like can operate it for example. In addition, it may be provided both near the display unit 5 and on the POS terminal 2.

The storage 8 is formed of e.g. a high-capacity hard disk or a nonvolatile memory, and the icons of plural card services are stored therein. As the announcement data, data that allows easy understanding of the kind of card service can be used besides the icon. Such data is composed of e.g. a still image, a moving image, character data, audio data, or a combination of these data. Specifically, the name of the card service, the name of the IC card issuer company, an icon representing the brand image, audio data individually provided for the card service, and so on may be used.

In addition, the storage 8 stores error message data e.g. for announcing that the processing of the IC card is not completed because the kinds of card services that can be used in the store are not included in the plural card services included in the IC card 4, or because the selected card service does not correspond with the card service held over the contactless communication unit 6 by the user, or because the money data stored in the card-side memory 4b in the IC card 4 is smaller than the purchase price and therefore money decrease processing can not be executed, for example. Moreover, the storage 8 stores operation confirmation message data e.g. for announcing that processing with the IC card has been completed as a result of the matching of the selected card service with the IC card 4 held over the contactless communication unit 6 by the user. These error message data and operation confirmation message data are composed of an icon, a still image, a moving image, character data, audio data, or a combination of these data, similarly to the above-described announcement data.

These data stored in the storage 8 are displayed on the display unit 5. These data stored in the storage 8 may be output as sounds from the speaker 9 in addition to the displaying on the display unit 5.

The communication unit 10 communicates with the POS terminal 2 via a network such as a WAN (Wide Area Network) or a LAN (Local Area Network). The communication unit 10 communicates to the POS terminal 2 via the network e.g. that the money decrease processing of the IC card 4 has been executed and updating of the money data in the card-side memory 4b in the IC card 4 has been correctly completed. Subsequently, a store staff carries out payment processing for the desired commercial product to be purchased by the user by the POS terminal 2.

The controller 11 controls the operation of the whole of the display device 1 and includes an arithmetic unit 11a and a control memory 11b for storing control programs. Stored in this control memory 11b are a control program for displaying announcement data stored in the storage 8, a control program for contactless communication with the respective IC cards 4, a control program for selecting the kinds of card services that can be used in the store from the card services included in the IC card 4 held by a user, a control program for displaying announcement data for announcement relating to the kind of selected card service, and so on. The controller 11 executes arithmetic operation by the arithmetic unit 11a in accordance with these programs to thereby control the operation of the entire device.

Figure 6:
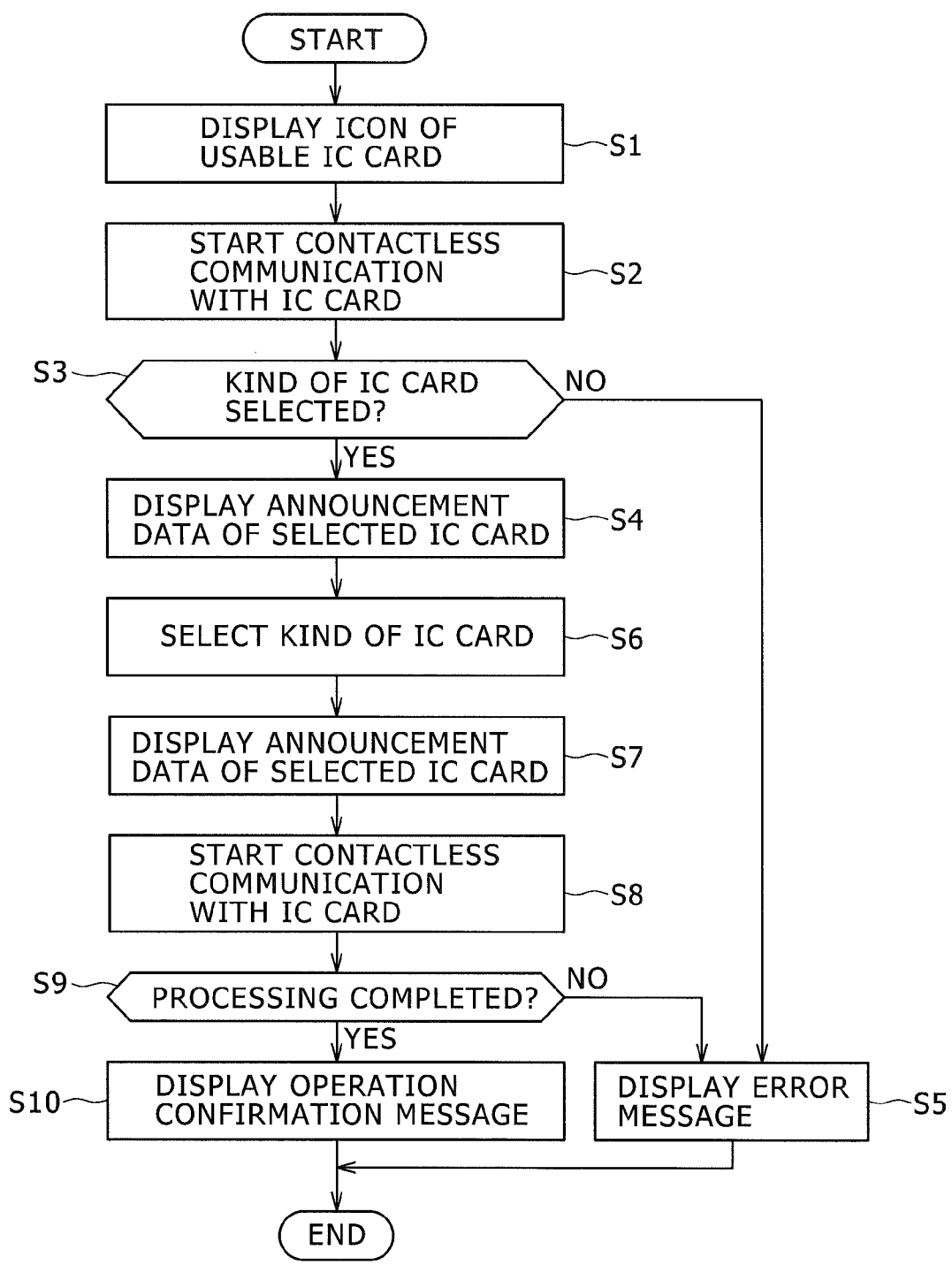
FIG. 6 is a flowchart showing the operation of the display device to which the present invention is applied.

A description will be made below with reference to FIG. 6 about a series of operation until a user having the IC card 4 that allows use of plural card services purchases a desired commercial product and payment processing is executed with the display device 1 having the above-described configuration.

In a step S1, the controller 11 accesses the storage 8 to display, on the display unit 5, the icons and card service names of all the kinds of card services that are usable in the store, stored in the storage 8, as shown in FIG. 3 and sequentially output the names of all the kinds of card services as sounds from the speaker 9.

In a step S2, when the IC card 4 is held over the contactless communication unit 6 provided in such a manner as to overlap with the display unit 5, the controller 11 starts contactless communication with the IC card 4 via the contactless communication unit 6.

In a step S3, through the contactless communication with the IC card 4 via the contactless communication unit 6, the controller 11 sequentially accesses the predetermined addresses defined corresponding to the respective card services and determines whether or not interaction with the respective addresses is possible.

In a step S4, the controller 11 accesses the storage 8 to display, on the display unit 5, the icons 5b and 5c and the card service names 5e and 5f relating to the card services with which interaction is possible and sequentially output the names 5e and 5f of all the kinds of card services with which interaction is possible as sounds from the speaker 9.

If it is determined that the IC card 4 held over the contactless communication unit 6 does not include the card service with which interaction is possible, in a step S5, the controller 11 accesses the storage 8 to display, on the display unit 5, an error message as an icon indicating that processing with the IC card 4 is not completed and output an error message from the speaker 9 as audio indicating that processing with the IC card 4 is not completed.

In a step S6, the user selects by the operation component 7 the kind of card service to be used by the user from the card services with which interaction is possible, displayed on the display unit 5, as shown in FIG. 4. At this time, when an operation signal is input due to the operation of the operation component 7 by the user, the controller 11 moves the cursor 5a displayed on the display unit 5 in accordance with this operation signal. A store staff may carry out the operation of selecting the kind of card service to be used by the user with the display device 1.

In a step S7, upon the selection of the kind of card service to be used by the user, the controller 11 accesses the storage 8 to display only the icon 5b of the selected card service on the display unit 5 as shown in FIG. 5 and output the name of the kind of selected card service as a sound from the speaker 9. Furthermore, the controller 11 instructs the contactless communication unit 6 to carry out contactless communication with only the selected IC card 4.

In a step S8, when the IC card 4 is held again over the contactless communication unit 6 provided in such a manner as to overlap with the display unit 5 displaying the selected card service, the controller 11 starts contactless communication with the IC card 4 via the contactless communication unit 6. The controller 11 determines whether or not the selected card service corresponds with the kind of card service in the IC card 4 held over the contactless communication unit 6 by the user. Subsequently, the controller 11 reads out money data from the card-side memory 4b in the IC card 4 by the contactless communication unit 6 and executes money decrease processing corresponding to the purchase price. Subsequently, the money data resulting from the money decrease processing, history data, and so on are transmitted to the IC card 4, so that the data in the card-side memory 4b is updated.

In a step S9, it is determined whether or not the processing has been correctly executed between the contactless communication unit 6 and the IC card 4.

If the processing has been correctly executed between the contactless communication unit 6 and the IC card 4, in a step S10, the controller 11 accesses the storage 8 to display, on the display unit 5, an operation confirmation message as an icon indicating that the processing with the IC card 4 has been completed and output an operation confirmation message from the speaker as audio indicating that the processing with the IC card 4 has been completed.

Possibly the processing is not correctly executed between the contactless communication unit 6 and the IC card 4 e.g. because the selected card service does not correspond with the card service in the IC card 4 held over the contactless communication unit 6 by the user or because the money data stored in the card-side memory 4b in the IC card 4 is smaller than the purchase price and therefore the money decrease processing can not be executed. In this case, in the step S5, the controller 11 accesses the storage 8 to display, on the display unit 5, an error message as an icon indicating that the processing with the IC card 4 is not completed and output an error message from the speaker 9 as audio indicating that the processing with the IC card 4 is not completed.

Subsequently, the controller 11 transmits a signal indicating that the updating of the money data in the card-side memory 4b in the IC card 4 has been completed to the POS terminal 2 via the communication unit 10.

The display device 1 is not limited to the IC card 4 that allows use of plural card services but applied also to the IC card 4 that allows use of one card service. In this case, the display device 1 may cause the controller 11 to select the kind of the IC card 4 in the step S6 instead of entrusting a user to select the kind of the IC card 4 by the operation component 7 for example because which card service is to be used by the user is known. This allows the display device 1 to execute processing until payment processing and so on through only one time of holding of the IC card 4 over the contactless communication unit 6.

This display device 1 can be applied also to the case in which the store can treat only one IC card 4 and the case in which selection is so made in advance e.g. at the time of the placement of the display device 1 that the display device 1 can treat only one IC card 4. In this case, the display device 1 may cause the controller 11 to select the kind of card service to be used by a user in the step S6 instead of entrusting the user to select the kind of card service by the operation component 7 for example because the card service in only one IC card 4 can be used. This allows the display device 1 to execute processing until payment processing and so on through only one time of holding of the IC card 4 over the contactless communication unit 6.

The display device 1 can be applied also to e.g. the case in which plural IC cards 4 each including one card service are collectively held over the contactless communication unit 6.

In the display device 1 having the above-described configuration, when a user having the IC card 4 that allows use of plural card services purchases a desired commercial product, the kinds of card services that are usable in this store among the card services included in the IC card 4 owned by the user are displayed as icons on the display unit 5 in response to holding of the IC card 4 over the contactless communication unit 6 by the user. Subsequently, when the kind of card service to be used by the user is selected by the operation component 7 from the kinds of card services displayed on the display unit 5, only the kind of selected card service is displayed as an icon on the display unit 5 and this kind of card service is output as a sound from the speaker 9. This can clearly show the user the card service selected by the user.

Furthermore, in the display device 1, the display unit 5 is so provided as to overlap with the contactless communication unit 6. Thus, the icon 5b indicating the card service selected by a user can be so provided as to overlap with the contactless communication unit 6. This can clearly show the user the place over which the IC card 4 should be held.

Figure 7:
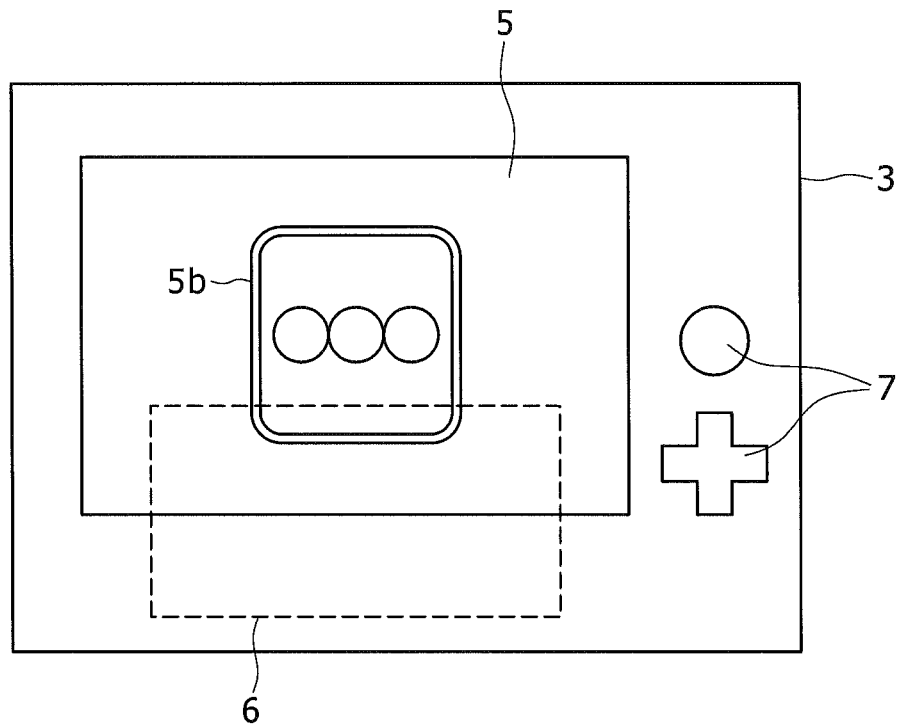
FIG. 7 is a diagram showing an embodiment in which the display unit and a contactless communication unit in the display device to which the present invention is applied are so provided as to partially overlap with each other.

The display device 1 is not limited to the structure in which all of the contactless communication unit 6 overlaps with the display unit 5, but the contactless communication unit 6 and the display unit 5 may be so provided as to partially overlap with each other as shown in FIG. 7. Also in the display device of FIG. 7, the card service selected by a user can be clearly shown. In addition, because the contactless communication unit 6 and the display unit 5 partially overlap with each other, the icon 5b of the selected card service can be provided near the contactless communication unit 6. This can clearly show the user the place over which the IC card 4 should be held.

Figure 8:
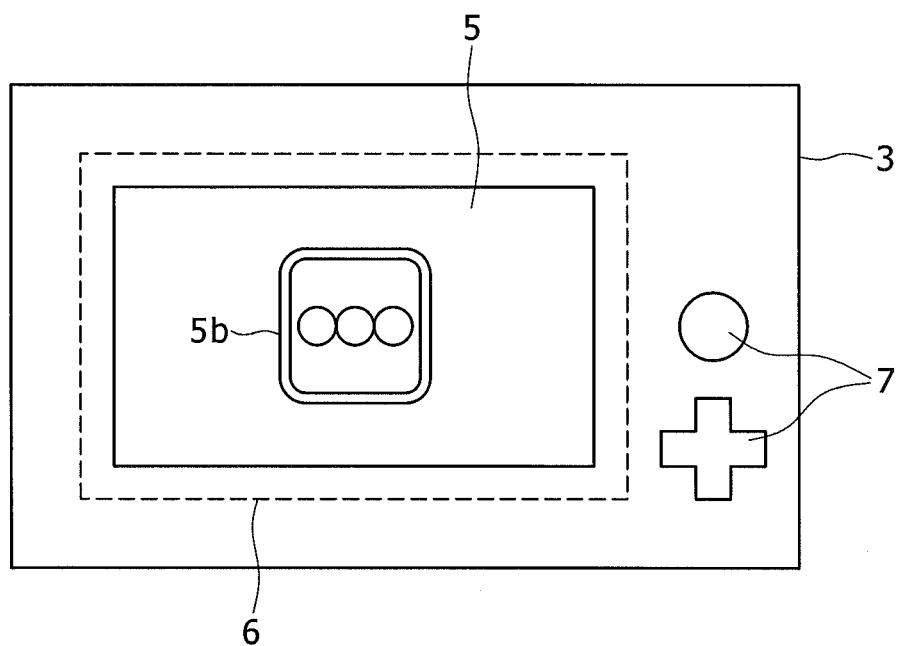
FIG. 8 is a diagram showing an embodiment in which the display unit and the contactless communication unit in the display device to which the present invention is applied are provided close to each other.

The display device 1 is not limited to the structure in which the contactless communication unit 6 is so provided that at least a part of the contactless communication unit 6 overlaps with the display unit 5, but the contactless communication unit 6 may be provided near the display unit 5, specifically may be provided near the outside of the display unit 5 as shown in FIG. 8 for example. Also in the display device of FIG. 8, the card service selected by a user can be clearly shown. In addition, because the contactless communication unit 6 is provided near the display unit 5, the icon 5b of the selected card service can be provided near the contactless communication unit 6. This can clearly show the user the place over which the IC card 4 should be held.

Figure 9:
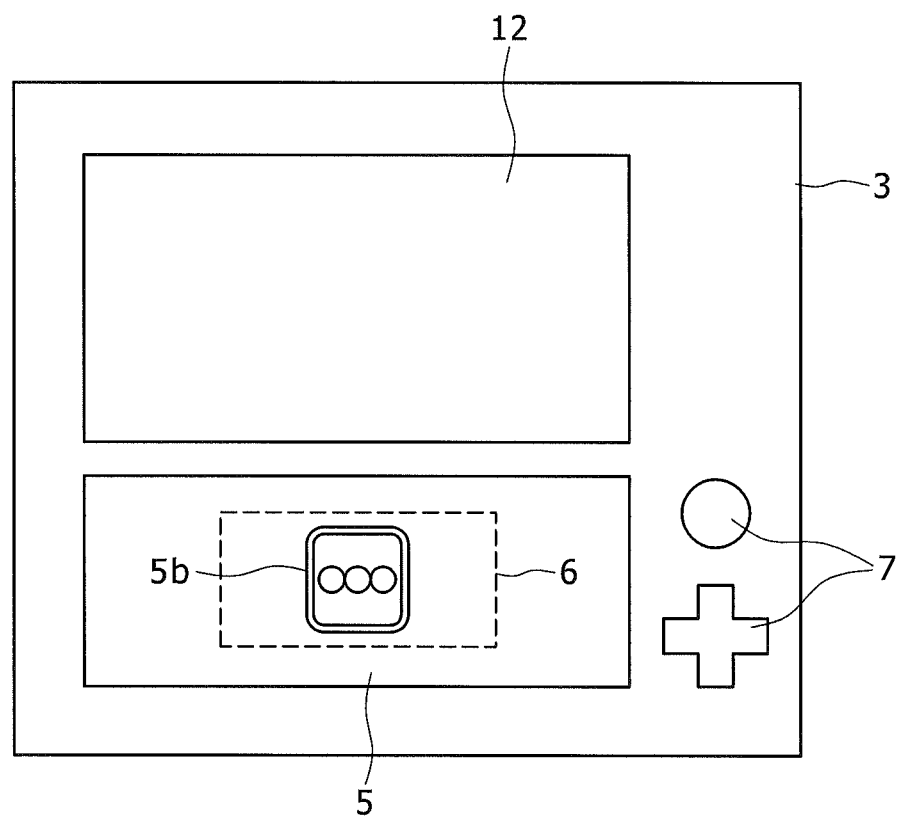
FIG. 9 is a diagram showing an embodiment in which the display device to which the present invention is applied is provided with another display unit.

The display device 1 may be provided with another display unit 12 for displaying advertisement data as shown in FIG. 9. Specifically, the display unit 12 displays advertisement data composed of a moving image, a still image, audio data, character data, or the like. Examples of the advertisement data include, but not limited to, a coupon and an advertisement. The display unit 12 displays the advertisement data in such a manner as to change the contents of the advertisement data every predetermined time for example. The advertisement data may be output as sounds from the speaker 9 in addition to the displaying on the display unit 12. When a user having the IC card 4 that allows use of plural card services acquires advertisement data, the user holds the IC card 4 over the contactless communication unit 6. In response to this, the display device 1 displays the advertisement data that can be acquired in this store among the card services included in the IC card 4 held by the user as icons on the display unit 5. When the advertisement data to be acquired by the user is selected by the operation component 7 from the advertisement data displayed on the display unit 5, the display device 1 displays only the selected advertisement data as an icon on the display unit 5 and outputs this advertisement data as a sound from the speaker 9. This can clearly show the user the advertisement data that can be acquired by the user. Furthermore, in this display device 1, the display unit 5 and the contactless communication unit 6 overlap with each other, and the icon of advertisement data is so displayed on the display unit 5 that at least a part of the icon overlaps with the contactless communication unit or the icon is displayed near the contactless communication unit 6. This can clearly show a user the place over which the IC card 4 should be held.

Figure 10:
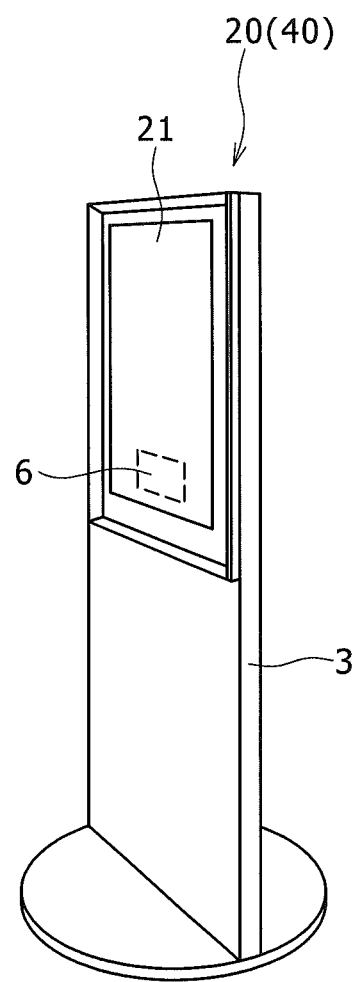
FIG. 10 is a diagram showing an embodiment in which the device main body of the display device to which the present invention is applied is provided as a stand type.

The display device 1 may display advertisement data composed of a moving image, a still image, audio data, character data, or the like, including a coupon, an advertisement, and so on, on the display unit 5. Specifically, as shown in FIG. 10, the display device 1 is used also as an advertisement display device 20 that is formed as a stand-type device and placed at a station, an open space, a lobby of a hotel, or the like. This advertisement display device 20 includes a large screen 21 and the contactless communication unit 6 is provided in a part of the large screen 21. Thus, when a user having the IC card 4 that allows use of plural card services acquires advertisement data, the user holds the IC card 4 over the contactless communication unit 6. In response to this, this advertisement display device 20 displays the advertisement data that can be acquired from this advertisement display device 20 among the card services included in the IC card 4 held by the user as icons on the large screen 21. When the advertisement data to be acquired by the user is selected by the operation component 7 from the advertisement data displayed on the large screen 21, the advertisement display device 20 displays only the selected advertisement data as an icon on the display unit 5 and outputs this advertisement data as a sound from the speaker 9. This can clearly show the user the advertisement data that can be acquired by the user. Furthermore, in this advertisement display device 20, the large screen 21 and the contactless communication unit 6 overlap with each other, and the icon of advertisement data is so displayed on the large screen 21 that at least a part of the icon overlaps with the contactless communication unit 6 or the icon is displayed near the contactless communication unit 6. This can clearly show a user the place over which the IC card 4 should be held.

The display device 1 is not limited to being provided near the POS terminal 2 but may be provided in an information processing device such as a notebook or desktop personal computer including the contactless communication unit 6. In this case, installing the program according to the present invention in the information processing device including the contactless communication unit 6 allows this device to carry out the same operation as the above-described operation as a device for personal use.

The element held over the contactless communication unit 6 in the display device 1 is not limited to the IC card 4 but a portable information processing device such as a cellular phone including an IC chip may be held over the contactless communication unit 6.

Another example of the display device to which the present invention is applied will be described below with reference to a drawing.

In the example to be described below, the IC card 4 is held over the contactless communication unit after the card service to be used by the user is selected from plural card services, in contrast to the above-described example, in which a user selects the card service to be used after the user holds the IC card 4 that allows use of plural card services over the contactless communication unit.

In the following, for a display device 30, the same components as those in the above-described display device 1 are given the same numerals and the description thereof is omitted.

As shown in FIGS. 1 and 2, the display device 30 to which the present invention is applied is placed near the POS terminal 2 placed in a store such as a supermarket or a convenience store.

This display device 30 includes the device main body 3 serving as a plate external case with a substantially-rectangular shape, the display unit 5 for displaying the kinds of IC cards 4 that are usable in this store, the contactless communication unit 6 for contactless communication with the IC card 4, and the operation component 7 as selection means for selection of the kind of IC card 4. Furthermore, the display device 30 includes the storage 8 for storing announcement data relating to the IC cards, the speaker 9 for announcement to a user, the communication unit 10 for communication with the POS terminal 2 via a network, and the controller for controlling the operation of the entire device. The display device 30 has the same configuration as that of the above-described display device 1 and therefore the description thereof is omitted.

When a user having plural kinds of IC cards 4 purchases a desired commercial product, with this display device 30, the kind of IC card 4 to be used by the user is selected by the operation component 7 on the display unit 5 displaying all the kinds of IC cards 4 that are usable in this store as icons. Thereupon, the display device 30 displays the kind of selected IC card 4 as an icon on the display unit 5 and outputs the kind of IC card 4 as a sound from the speaker 9. Subsequently, the user holds the IC card 4 over the contactless communication unit 6 provided in such a manner as to overlap with the display unit 5 displaying the icon of the selected IC card 4. Thereupon, the display device 30 carries out contactless communication with the IC card 4 in order to execute payment processing and so on.

Figure 11:
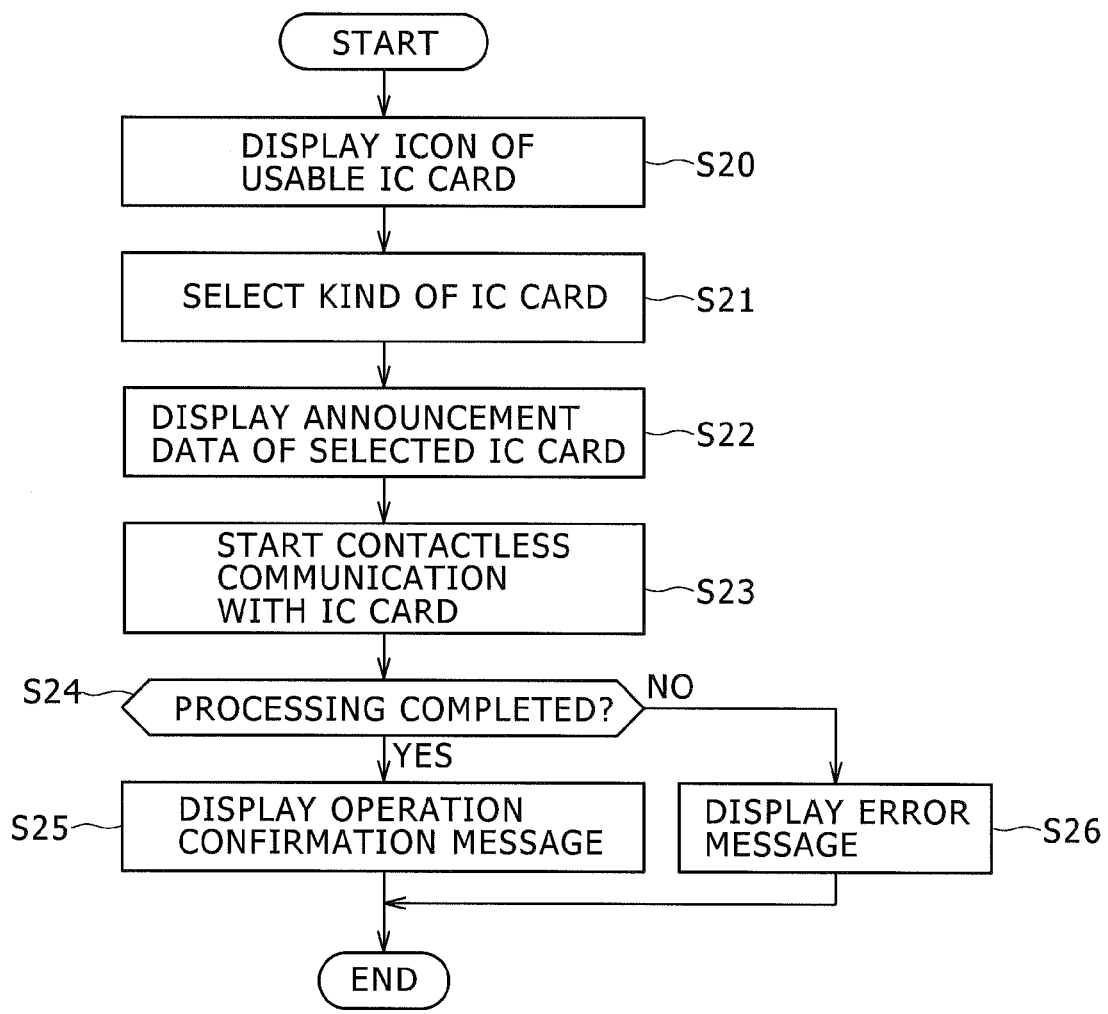
FIG. 11 is a flowchart showing the operation of another example of the display device to which the present invention is applied.

A description will be made below with reference to FIG. 11 about a series of operation until a user having plural IC cards 4 each including one card service purchases a desired commercial product and payment processing is executed with the display device 30 having the above-described configuration.

In a step S20, the controller 11 accesses the storage 8 to display, on the display unit 5, all the kinds of IC cards 4 that are usable in this store, stored in the storage 8, as icons and output all the kinds of IC cards 4 as sounds from the speaker 9.

In a step S21, when the user having plural kinds of IC cards 4 purchases a desired commercial product, the user selects, by the operation component 7, the kind of IC card 4 to be used by the user from the IC cards 4 that are usable in this store, displayed on the display unit 5, as shown in FIG. 3. At this time, when an operation signal is input due to the operation of the operation component 7 by the user, the controller 11 moves the cursor 5a displayed on the display unit 5 in accordance with this operation signal. A store staff may carry out the operation of selecting the kind of IC card 4 to be used by the user with the display device 1.

In a step S22, upon the selection of the kind of IC card 4, the controller 11 accesses the storage 8 to display only the icon 5b of the selected IC card 4 on the display unit 5 as shown in FIG. 5 and output the kind of IC card 4 as a sound from the speaker 9.

In a step S23, when the IC card 4 is held over the contactless communication unit 6 provided in such a manner as to overlap with the display unit 5 displaying the selected IC card 4, the controller 11 starts contactless communication with the IC card 4 via the contactless communication unit 6. The controller 11 determines whether or not the selected IC card 4 corresponds with the kind of IC card 4 held over the contactless communication unit 6 by the user. Subsequently, the controller 11 reads out money data from the card-side memory 4b in the IC card 4 by the contactless communication unit 6 and executes money decrease processing corresponding to the purchase price. Subsequently, the money data resulting from the money decrease processing, history data, and so on are transmitted to the IC card 4, so that the data in the card-side memory 4b is updated.

In a step S24, it is determined whether or not the processing has been correctly executed between the contactless communication unit 6 and the IC card 4.

If the processing has been correctly executed between the contactless communication unit 6 and the IC card 4, in a step S25, the controller 11 accesses the storage 8 to display, on the display unit 5, an operation confirmation message as an icon indicating that the processing with the IC card 4 has been completed and output an operation confirmation message from the speaker as audio indicating that the processing with the IC card 4 has been completed.

Possibly the processing is not correctly executed between the contactless communication unit 6 and the IC card 4 e.g. because the selected IC card 4 does not correspond with the IC card 4 held over the contactless communication unit 6 by the user or because the money data stored in the card-side memory 4b in the IC card 4 is smaller than the purchase price and therefore the money decrease processing can not be executed. In this case, in a step S26, the controller 11 accesses the storage 8 to display, on the display unit 5, an error message as an icon indicating that the processing with the IC card 4 is not completed and output an error message from the speaker 9 as audio indicating that the processing with the IC card 4 is not completed.

Subsequently, the controller 11 transmits a signal indicating that the updating of the money data in the card-side memory 4b in the IC card 4 has been completed to the POS terminal 2 via the communication unit 10.

In the display device 30 having the above-described configuration, when a user having plural kinds of IC cards 4 purchases a desired commercial product, the kind of IC card 4 to be used by the user is selected by the operation component 7 on the display unit 5 displaying the kinds of IC cards 4 that are usable in this store as icons or the like. Thereupon, the display device 30 displays the icon 5b of the selected IC card 4 on the display unit 5 and outputs the kind of IC card 4 as a sound from the speaker 9. This can clearly show the user the IC card 4 selected by the user.

Furthermore, in the display device 30, the display unit 5 is so provided as to overlap with the contactless communication unit 6. Thus, the icon 5b indicating the selected IC card 4 can be so provided as to overlap with the contactless communication unit 6. This can clearly show the user the place over which the IC card 4 should be held.

The display device 30 is not limited to the structure in which all of the contactless communication unit 6 overlaps with the display unit 5, but the contactless communication unit 6 and the display unit 5 may be so provided as to partially overlap with each other as shown in FIG. 7. Also in the display device 30 of FIG. 7, the IC card 4 selected by a user can be clearly shown. In addition, because the contactless communication unit 6 and the display unit 5 partially overlap with each other, the icon 5b of the selected IC card 4 can be provided near the contactless communication unit 6. This can clearly show the user the place over which the IC card 4 should be held.

The display device 30 is not limited to the structure in which the contactless communication unit 6 is so provided that at least a part of the contactless communication unit 6 overlaps with the display unit 5, but the contactless communication unit 6 may be provided near the display unit 5, specifically may be provided near the outside of the display unit 5 as shown in FIG. 8 for example. Also in the display device 30 of FIG. 8, the IC card 4 selected by a user can be clearly shown. In addition, because the contactless communication unit 6 is provided near the display unit 5, the icon 5b of the selected IC card 4 can be provided near the contactless communication unit 6. This can clearly show the user the place over which the IC card 4 should be held.

The display device 30 may be provided with another display unit 12 for displaying advertisement data as shown in FIG. 9. Specifically, the display unit 12 displays advertisement data composed of a moving image, a still image, audio data, character data, or the like. Examples of the advertisement data include, but not limited to, a coupon and an advertisement. The display unit 12 displays the advertisement data in such a manner as to change the contents of the advertisement data every predetermined time for example. The advertisement data may be output as sounds from the speaker 9 in addition to the displaying on the display unit 12. With the display device 30, advertisement data displayed on the display unit 12 is selected by a user or a store staff by the operation component 7. Thereupon, the display device 30 displays, on the display unit 5, the IC cards 4 that can store the selected advertisement data as icons and outputs the kinds of IC card 4 that can store the selected advertisement data as sounds from the speaker 9. Subsequently, the user or the store staff selects the IC card 4 displayed on the display unit 5 by the operation component 7 and then the IC card 4 to store the selected advertisement data is held over the contactless communication unit 6. This allows the selected advertisement data to be easily acquired in the IC card 4.

The display device 30 may display advertisement data composed of a moving image, a still image, audio data, character data, or the like, including a coupon, an advertisement, and so on, on the display unit 5. Specifically, as shown in FIG. 10, the display device 30 is used also as an advertisement display device 40 that is formed as a stand-type device and placed at a station, an open space, a lobby of a hotel, or the like. This advertisement display device 40 includes the large screen 21 and the contactless communication unit 6 is provided in a part of the large screen 21. Thus, with this advertisement display device 40, a user selects a coupon displayed on the large screen by the operation component 7 such as a touch panel and holds the IC card 4 over the contactless communication unit 6 on which the icon and coupon name of the selected coupon are displayed, for example. This allows the selected coupon to be easily acquired in the IC card 4. Furthermore, in this advertisement display device 40, the large screen 21 and the contactless communication unit 6 overlap with each other, and the icon and coupon name of a coupon are so displayed on the large screen 21 that at least a part of the icon and the coupon name overlap with the contactless communication unit 6 or they are displayed near the contactless communication unit 6. This can clearly show a user the place over which the IC card 4 should be held.

The display device 30 is not limited to being provided near the POS terminal 2 but may be provided in an information processing device such as a notebook or desktop personal computer including the contactless communication unit 6. In this case, installing the program according to the present invention in the information processing device including the contactless communication unit 6 allows this device to carry out the same operation as the above-described operation as a device for personal use.

The element held over the contactless communication unit 6 in the display device 30 is not limited to the IC card 4 but a portable information processing device such as a cellular phone including an IC chip may be held over the contactless communication unit 6.

The invention claimed is:

1. A display device comprising:
a display unit;
a contactless communication unit that is so provided that at least a part of the contactless communication unit overlaps with the display unit or is provided near the display unit, and carries out contactless communication with plural kinds of memories;
a storage unit that stores announcement data for announcement relating to kinds of memories with which contactless communication by the contactless communication unit is available;
a selection unit for selecting a kind of one memory with which contactless communication is to be carried out from kinds of the memories; and
a control unit that displays announcement data stored in the storage unit on the display unit before readout of a kind of the memory by the contactless communication unit and selects kinds of the memories with which contactless communication by the contactless communication unit is available, the control unit displaying, on the display unit, the announcement data for announcement relating to a kind of one memory with which contactless communication is to be carried out.

2. The display device according to claim 1, further including:
another selection unit for selecting kinds of the memories with which contactless communication by the contactless communication unit is available.

3. The display device according to claim 1, wherein the announcement data is an icon displayed on the display unit.

4. The display device according to claim 1, wherein the control unit announces completion of processing after readout of a kind of the memory by the contactless communication unit.

5. The display device according to claim 1, wherein the control unit announces that processing is not completed after readout of a kind of the memory by the contactless communication unit.

6. The display device according to claim 1, further comprising
another display unit that displays advertisement data.

7. A display method comprising:
a step of displaying, on a display unit, announcement data that are stored in a storage unit and provide announcement relating to kinds of memories with which contactless communication by a contactless communication unit is available;
a step of carrying out contactless communication by the contactless communication unit that is so provided that at least a part of the contactless communication unit overlaps with the display unit or is provided near the display unit;
a step of selecting, by a selection unit, a kind of one memory with which contactless communication is to be carried out from the kinds of the memories; and
a step of displaying, on the display unit, the announcement data for announcement relating to the kind of the memory selected by the selection unit.

8. The display method of claim 7 further comprising:
selecting, by another selection unit, kinds of the memories with which contactless communication by the contactless communication unit is available.

9. A non-transitory storage medium on which is recorded a program for causing a computer to execute processing of:
displaying, on a display unit, announcement data that are stored in a storage unit and provide announcement relating to kinds of memories with which contactless communication by a contactless communication unit is available;
carrying out contactless communication by the contactless communication unit that is so provided that at least a part of the contactless communication unit overlaps with the display unit or is provided near the display unit;
selecting, by a selection unit, a kind of one memory with which contactless communication is to be carried out from the kinds of the memories; and
displaying, on the display unit, the announcement data for announcement relating to the kind of the memory selected by the selection unit.

10. The storage medium of claim 9, wherein the processing further comprises:
selecting, by another selection unit, kinds of the memories with which contactless communication by the contactless communication unit is available.

11. A display device comprising:
a display unit;
a contactless communication unit that is so provided that at least a part of the contactless communication unit overlaps with the display unit or is provided near the display unit, and carries out contactless communication with plural kinds of memories;
a storage unit that stores announcement data for announcement relating to kinds of memories with which contactless communication by the contactless communication unit is available;
a selection unit for selecting a kind of one memory with which contactless communication is to be carried out from kinds of the memories; and
a control unit that displays announcement data stored in the storage unit on the display unit before selection of a kind of the memory by the selection unit, and displays the announcement data that is selected on the display unit after selection of the kind of the one memory by the selection unit.

12. The display device according to claim 11, further including:
another selection unit for selecting kinds of the memories with which contactless communication by the contactless communication unit is available.

13. The display device according to claim 11, wherein the announcement data is an icon displayed on the display unit.

14. The display device according to claim 11, wherein the control unit announces completion of processing after selection of a kind of the memory by the selection unit.

15. The display device according to claim 11, wherein the control unit announces that processing is not completed after selection of a kind of the memory by the selection unit.

16. The display device according to claim 11, further comprising
another display unit that displays advertisement data.

17. A display method comprising:
a step of displaying, on a display unit, announcement data that are stored in a storage unit and provide announcement relating to kinds of memories;
a step of selecting, by a selection unit, a kind of one memory with which contactless communication is to be carried out from kinds of the memories;

a step of displaying the announcement data relating to a kind of the one memory selected by the selection unit on the display unit; and a step of carrying out contactless communication by a contactless communication unit that is so provided that at least a part of the contactless communication unit overlaps with the display unit or is provided near the display unit.

18. The display method according to claim 17 further comprising:

selecting, by another selection unit, kinds of the memories with which contactless communication by the contactless communication unit is available.

19. A non-transitory storage medium on which is recorded a program for causing a computer to execute processing of:

displaying, on a display unit, announcement data that are stored in a storage unit and provide announcement relating to kinds of memories;

selecting, by a selection unit, a kind of one memory with which contactless communication is to be carried out from kinds of the memories;

displaying the announcement data relating to a kind of the one memory selected by the selection unit on the display unit; and carrying out contactless communication by a contactless communication unit that is so provided that at least a part of the contactless communication unit overlaps with the display unit or is provided near the display unit.

20. The storage medium according to claim 19, wherein the processing further comprises: selecting, by another selection unit, kinds of the memories with which contactless communication by the contactless communication unit is available.

21. A display device comprising:

a display unit;

a contactless communication unit that is so provided that at least a part of the contactless communication unit overlaps with the display unit or is provided near the display unit, and carries out contactless communication with plural kinds of payment services;

a storage unit that stores announcement data for announcement relating to kinds of payment services with which contactless communication by the contactless communication unit is available;

a selection unit for selecting a kind of one payment service with which contactless communication is to be carried out from kinds of the payment services; and a control unit that displays announcement data stored in the storage unit on the display unit before readout of a kind of the payment service by the contactless communication unit and selects kinds of the payment services with which contactless communication by the contactless communication unit is available, the control unit displaying, on the display unit, the announcement data for announcement relating to a kind of one payment service with which contactless communication is to be carried out.

22. A display method comprising:

a step of displaying, on a display unit, announcement data that are stored in a storage unit and provide announcement relating to kinds of payment services with which contactless communication by a contactless communication unit is available;

a step of carrying out contactless communication by the contactless communication unit that is so provided that at least a part of the contactless communication unit overlaps with the display unit or is provided near the display unit;

a step of selecting, by a selection unit, a kind of one payment service with which contactless communication is to be carried out from the kinds of the payment services; and a step of displaying, on the display unit, the announcement data for announcement relating to the kind of the payment service selected by the selection unit.

23. A non-transitory storage medium on which is recorded a program for causing a computer to execute processing of:

displaying, on a display unit, announcement data that are stored in a storage unit and provide announcement relating to kinds of payment services with which contactless communication by a contactless communication unit is available;

carrying out contactless communication by the contactless communication unit that is so provided that at least a part of the contactless communication unit overlaps with the display unit or is provided near the display unit;

selecting, by a selection unit, a kind of one payment service with which contactless communication is to be carried out from the kinds of the payment services; and displaying, on the display unit, the announcement data for announcement relating to the kind of the payment service selected by the selection unit.

24. A display device comprising:

a display unit;

a contactless communication unit that is so provided that at least a part of the contactless communication unit overlaps with the display unit or is provided near the display unit, and carries out contactless communication with plural kinds of payment services;

a storage unit that stores announcement data for announcement relating to kinds of payment services with which contactless communication by the contactless communication unit is available;

a selection unit for selecting a kind of one payment service with which contactless communication is to be carried out from kinds of the payment services; and a control unit that displays announcement data stored in the storage unit on the display unit before selection of a kind of the payment service by the selection unit, and displays the announcement data that is selected on the display unit after selection of the kind of the one payment service by the selection unit.

* * * * *